(12) United States Patent
Takasaka et al.

(10) Patent No.: US 7,151,723 B2
(45) Date of Patent: Dec. 19, 2006

(54) OPTICAL DISC DEVICE

(75) Inventors: Norikazu Takasaka, Iruma (JP); Akira Mashimo, Tokorozawa (JP)

(73) Assignee: Teac Corporation, Tokyo (JP)

( * ) Notice: Subject to any disclaimer, the term of this patent is extended or adjusted under 35 U.S.C. 154(b) by 584 days.

(21) Appl. No.: 09/940,349

(22) Filed: Aug. 27, 2001

(65) Prior Publication Data

US 2002/0041546 A1 Apr. 11, 2002

(30) Foreign Application Priority Data

Aug. 29, 2000 (JP) ............................. 2000-259569

(51) Int. Cl.
*G11B 7/00* (2006.01)
(52) U.S. Cl. ............................. 369/44.35; 369/44.41; 369/44.29; 369/44.36
(58) Field of Classification Search ............. 369/44.29, 369/44.36, 44.35
See application file for complete search history.

(56) References Cited

U.S. PATENT DOCUMENTS 6,101,157 A * 8/2000 Bradshaw et al. ........ 369/44.36

FOREIGN PATENT DOCUMENTS

| JP | 07-235072 | 9/1995 |
| JP | 11-195228 | 7/1999 |
| JP | 2000-285480 | 10/2000 |
| JP | 2001-143277 | 5/2001 |

* cited by examiner

*Primary Examiner*—Andrea Wellington
*Assistant Examiner*—Jorge L. Ortiz-Criado
(74) *Attorney, Agent, or Firm*—J.C. Patents

(57) ABSTRACT

An optical disc device for changing intensities of light beams illuminated on an optical disc. The optical disc device comprises the following elements. A photo detecting device divided into a plurality of photo detectors is used for detecting the reflected light beams illuminated on an optical disc. A plurality of amplifiers is used for changing gains to respectively amplify the output signals of the photo detectors when recording and reproducing on/from the optical disc. A calculating device is used for calculating the output signals of the amplifiers to generate the servo signals. By adding the correction offset signals for correcting the offset voltages of the amplifiers and the photo detectors to the amplifiers, the correction offset signals are amplified. It is, therefore, not necessary to change the correction offset voltages even though the gain of the amplifier is changed and not necessary to change the offset voltage and is independent of the gain-switching of the amplifier.

3 Claims, 7 Drawing Sheets

OPTICAL DISC DEVICE

CROSS-REFERENCE TO RELATED APPLICATION

This application claims the priority benefit of Japanese application serial no. 2000-259569, filed Aug. 29, 2000.

BACKGROUND OF THE INVENTION

1. Field of the Invention

The present invention relates in general to an optical disc device. More specifically, the present invention relates to an optical disc device capable of recording data on an erasable optical disc.

2. Description of Related Art

There are several types of recordable optical discs, such as a write-once optical disc and an erasable optical disc. The write-once optical disc such as a compact disc-recordable (CD-R) and the erasable optical disc such as a compact disc-rewritable (CD-RW) or a digital versatile disc-rewritable (DVD-RW) have pregrooves for guiding on the recording optical discs. The pregrooves are wobbled slightly along the radial direction of the optical disc with a central frequency of 22.05 KHz. The address data in recording, termed as absolute time in pregroove (ATIP), are recorded in a multiplex mode by FSK modulation with a maximum deviation frequency of ±1 KHz.

In regards to the tracking and focusing servo circuits of the optical disc device for recording and reproducing data on/from the optical disc, light beams are illuminated on the optical disc and the light beams reflected by the optical disc are detected by a number of photo detectors. According to a preset algorithm, the detected signals are used for generating the servo signals, which are used for driving an actuator to perform the tracking and focusing servo controls.

In regards to the optical disc device for recording and reproducing data on/from the erasable optical disc, such as the CD-RW, a 4T recording signal (EFM signal) is recorded as shown in FIG. 8A Referring to FIG. 8B, a recording signal value of "0" of the power of the light beam corresponds to the erase power Pe, and a recording signal value of "1" corresponds to the write power Pw and the read power Pb, wherein Pw and Pb alternate. In addition, the base time interval T is a period in a frequency of 4.32 MHz and of about 230 nsec.

Therefore, when data is reproduced, the incident light beams, which have the read power, are reflected by the optical disc and the reflected light beams are detected by the photo detectors and according to the detected signal, a tracking error signal is generated. When the data is recorded, the incident light beams, which have the write power and the erase power, are reflected by the optical disc and the reflected light beams are detected by the photo detectors and the sampling/hold circuits sample and hold the detected signal when the incident light beams have the erase and according to the sampling/hold signal, a tracking error signal is generated.

FIGS. 9 and 10 are exemplary circuit diagrams of a conventional servo signal generator. Referring to FIG. 9, spots of the light beams are illuminated on the optical disc and the light beams reflected by the optical disc are detected by four divided photo detectors 10A, 10B, 10C and 10D. The respective detected signals by the photo detectors 10A, 10B, 10C and 10D are transmitted to the corresponding sampling/hold circuits SA, SB, SC and SD. Based on the sampling/hold signal from the terminal 12, for example, a high-level timing, each of the sampling/hold circuits SA, SB, SC and SD samples and holds the detected signals, which are then respectively provided to the corresponding amplifiers GA, GB, GC and GD. According to a gain-switching signal from a terminal 14, the gains of the amplifiers GA, GB, GC and GD switch to different gains, which correspond to the foregoing detected signals when data are recorded and reproduced. Switching to different gains also causes the levels of the detected signals to have the same level when data are recorded and reproduced, which are then respectively outputted from the terminals 16A, 16B, 16C and 16D.

According to the foregoing servo signal generator, the variations in the offset voltage generated by the gain-switching of the amplifiers GA, GB, GC, GD are inputted to the servo signal calculating device. The total offset voltage of the generated servo signals is therefore affected. Particularly, in the situation of the addition signal, unlike the situation of the subtraction signal that the offset voltages can be eliminated, the influence of the offset voltages to the addition signal cannot be ignored. Therefore, the offset voltages have to be changed whenever the gain of the amplifier is changed.

Referring to FIG. 10, the detected signals A, B, C, D outputted from the amplifiers GA, GB, GC, GD are inputted to the calculating devices 18, 20. The calculating device 18 adds the detected signals A, B, C, D with a correction offset voltage Vosadd of the addition signal from the terminal 19 to generate an addition signal (A+B+C+D). The addition signal, which serves as the reflected light monitoring signal, is then outputted from the terminal 22. In addition, the calculating device 20 adds and subtracts the detected signals A, B, C, D with a correction offset voltage Vossub of the subtraction signal from the terminal 21 to generate a subtraction signal (A+B)−(C+D), which serves as the servo signal, and is then outputted from a terminal 24.

Assuming the offset voltages of the detected signals A, B, C and D respectively outputted from the sampling/hold circuits SA SB, SC, SD are Va, Vb, Vc, and Vd, and the input offset voltages of the amplifiers GA, GB, GC, GD are Vga, Vgb, Vgc, and Vgd respectively, the gains of the amplifiers GA, GB, GC, GD are G, and the calculating devices 18, 20 have no offset voltages. Under this condition, the total offset voltage of the addition signal Vadd is represented by the equation (1) below.

$$Vadd = G(Va+Vb+Vc+Vd+Vga+Vgb+Vgc+Vgd) \quad (1)$$

Namely, if the correction offset voltage Vosadd of the addition signal is −Vadd, the total offset voltage of the addition signal can be compensated.

$$Vosadd = -G(Va+Vb+Vc+Vd+Vga+Vgb+Vgc+Vgd)$$

However, due to the presence of the gain G of the amplifier in the above equation, there is a problem that the correction offset voltage Vosadd of the addition signal has to be changed with the gain G of the amplifier.

In addition, the total offset voltage of the subtraction signal Vsub is represented by the equation (2) below:

$$Vsub = G[(Va+Vb+Vga+Vgb)-(Vc+Vd+Vgc+Vgd)] \quad (2)$$

Namely, if the correction offset voltage Vossub of the subtraction signal is −Vsub, the total offset voltage of the subtraction signal can be compensated.

$$Vosadd = -G[(Va+Vb+Vga+Vgb)-(Vc+Vd+Vgc+Vgd)]$$

However, due to the presence of the gain G of the amplifier in the above equation, there is a problem that the correction offset voltage Vossub of the subtraction signal has to be changed with the gain G of the amplifier.

SUMMARY OF THE INVENTION

According to the foregoing description, an object of this invention is to provide an optical disc device, which does not need to change the offset voltageregardless of a change in the gain of the amplifier.

According to the object mentioned above, the invention provides an optical disc device for changing intensities of light beams illuminated on an optical disc. The optical disc device comprises the following elements. A photo detecting device divided into a plurality of photo detectors are used for detecting reflected light beams of the light beams illuminated on an optical disc. A plurality of amplifiers are used for changing gains to respectively amplify output signals of the photo detectors when data are recorded and reproduced on/from the optical disc. A calculating device is also used for calculating the output signals of the amplifiers to generate the servo signals. By adding correction offset signals for correcting offset voltages of the amplifiers and the photo detectors to the amplifiers, the correction offset signals are amplified and therefore it is not necessary to change the correction offset voltages even though the gain of the amplifier is changed.

The calculating device further comprises a first calculating device and a second calculating device for respectively performing different operations on the output signals of the amplifiers. Because the correction offset signals respectively added to the amplifiers farther comprise a first correction offset value that eliminates the offset voltages from a result of the first calculating device, and a second correction offset value that eliminates the offset voltages calculated from the second calculating device, the offset voltages calculated from the first and the second calculating devices can be eliminated.

The correction offset signals respectively added to the amplifiers are signals separated from the first and the second correction offset values. Because the second is offset value calculated from the first calculating device is "0" and the first offset value calculated from the second calculating device is "0", the offset voltages calculated from the first calculating devices can be eliminated without using the unnecessary second correction offset value and the offset voltages calculated from the second calculating devices can also be eliminated without using the unnecessary first correction offset value.

BRIEF DESCRIPTION OF THE DRAWINGS

While the specification concludes with claims particularly pointing out and distinctly claiming the subject matter which is regarded as the invention, the objects and features of the invention and further objects, features and advantages thereof will be better understood from the following description taken in connection with the accompanying drawings in which:

DESCRIPTION OF THE PREFERRED EMBODIMENT

Figure 1:
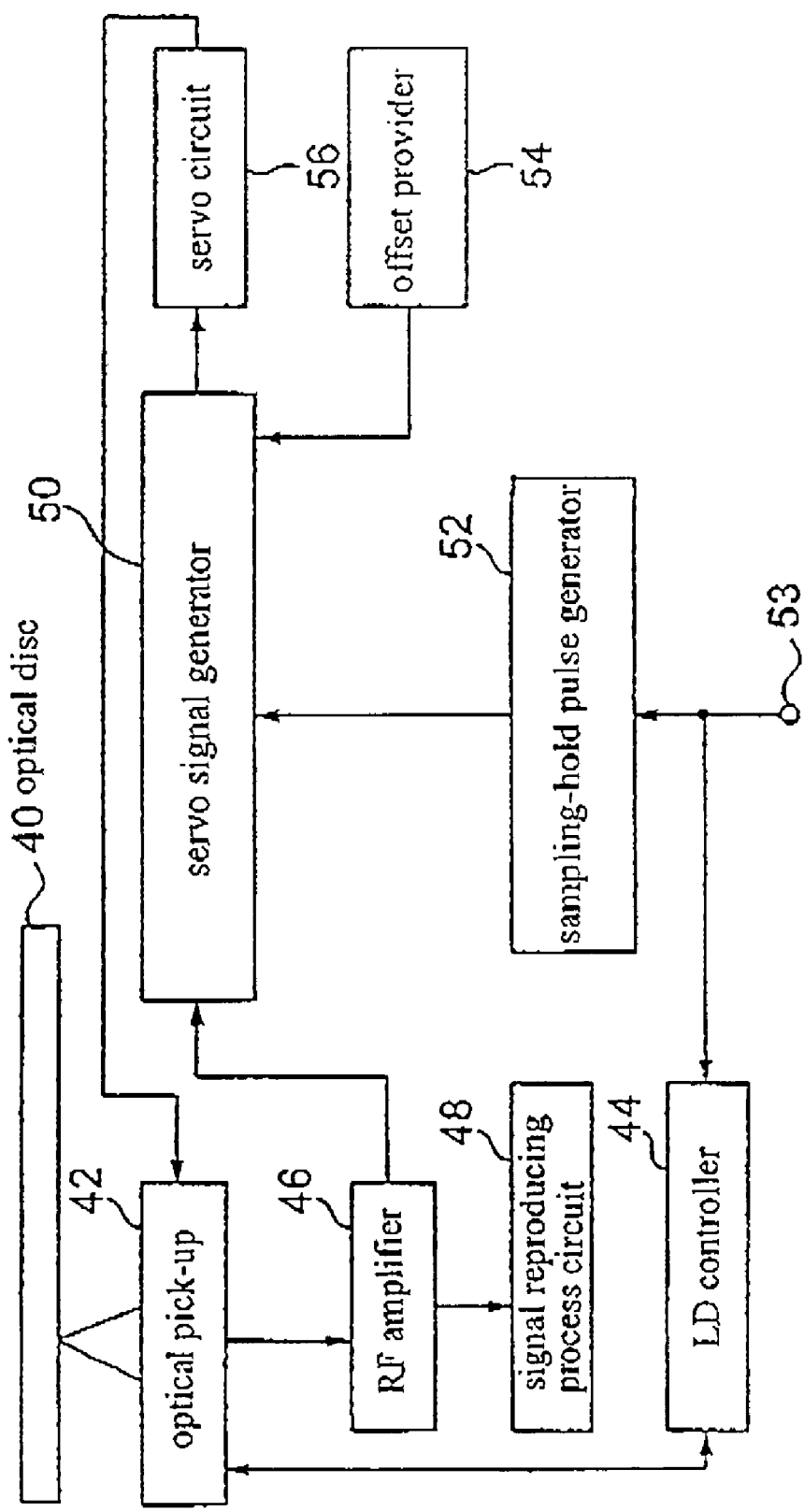
FIG. 1 is a block diagram of an optical disc device according to one preferred embodiment of the invention.

FIG. 1 is a block diagram of an optical disc device according to one preferred embodiment of the invention. A recordable disc 40, such as a CD-R or CD-RW type disc, is rotationally driven with a preset rotational speed by a spindle motor (not shown). An optical pick-up 42 is driven to move along the radial direction of the recordable disc 40 by a sled motor (not shown). The optical pick-up 42, in general, comprises an objective lens, an actuator, a ¼ wave plate, a collimator lens, a beam splitter, a light source (such as a laser diode), a front monitor and photo detectors, etc.

A laser diode (LD) controller 44 is used for controlling the laser diode in the optical pick-up 42 to emit laser beams with a read power Pb when reproducing data, or with an erase power Pe, a write power Pw and a read power Pb according to recording pulses when data is recorded. Additionally, the LD controller 44 is capable of controlling a laser driver to output laser beams with an optimal power according to the intensity of the laser beams detected by the front monitor in the optical pick-up 42.

A radio frequency (RF) amplifier 46 is used for amplifying a reproduced signal reproduced from the optical disc 40 by means of the photo detectors in the optical pick-up 42. The reproduced signal amplified by the RF amplifier 46 is transmitted to a signal-reproducing process circuit 48 and a servo signal generator 50.

The signal-reproducing process circuit 48 executes processes such as a decoding process in a cross interleaved Read-Solomon code (CIRC), an eight-to-fourteen modulation (EFM), and a synchronizing process, etc. Furthermore, the signal-reproducing process circuit 48 executes a decoding process for an error correct code (ECC) of the CD-ROM and a detecting process of the header. The reproduced data is then provided to a post-stage circuit (not shown) of the optical disc device.

The recording pulses from a terminal 53 are inputted to the LD controller 44 and a sampling pulse generator 52. The sampling pulse generator 52 generates a sampling/hold signal according to the recording pulses, which are supplied to the servo signal generator 50. A correction offset voltage for an addition signal and a correction offset voltage for a subtraction signal is pre-held in an offset provider 54 and is supplied to the servo signal generator 50.

The servo signal generator 50 is used for sampling-hold detected signals of the photo detector according to the sampling/hold signal from the sampling pulse generator 52. The servo signal generator 50 adds the correction offset voltages of the addition signal and the subtraction signal from the offset provider 54 to generate an addition signal, which serves as a reflected light monitoring signal, and a subtraction signal, which serves as a servo signal. The addition signal and the subtraction signal serving as a servo signal are then provided to the servo circuit 56. The servo circuit 56 drives the actuator in the optical pick-up 42 to perform a tracking servo control and a focusing servo control.

Figure 2:
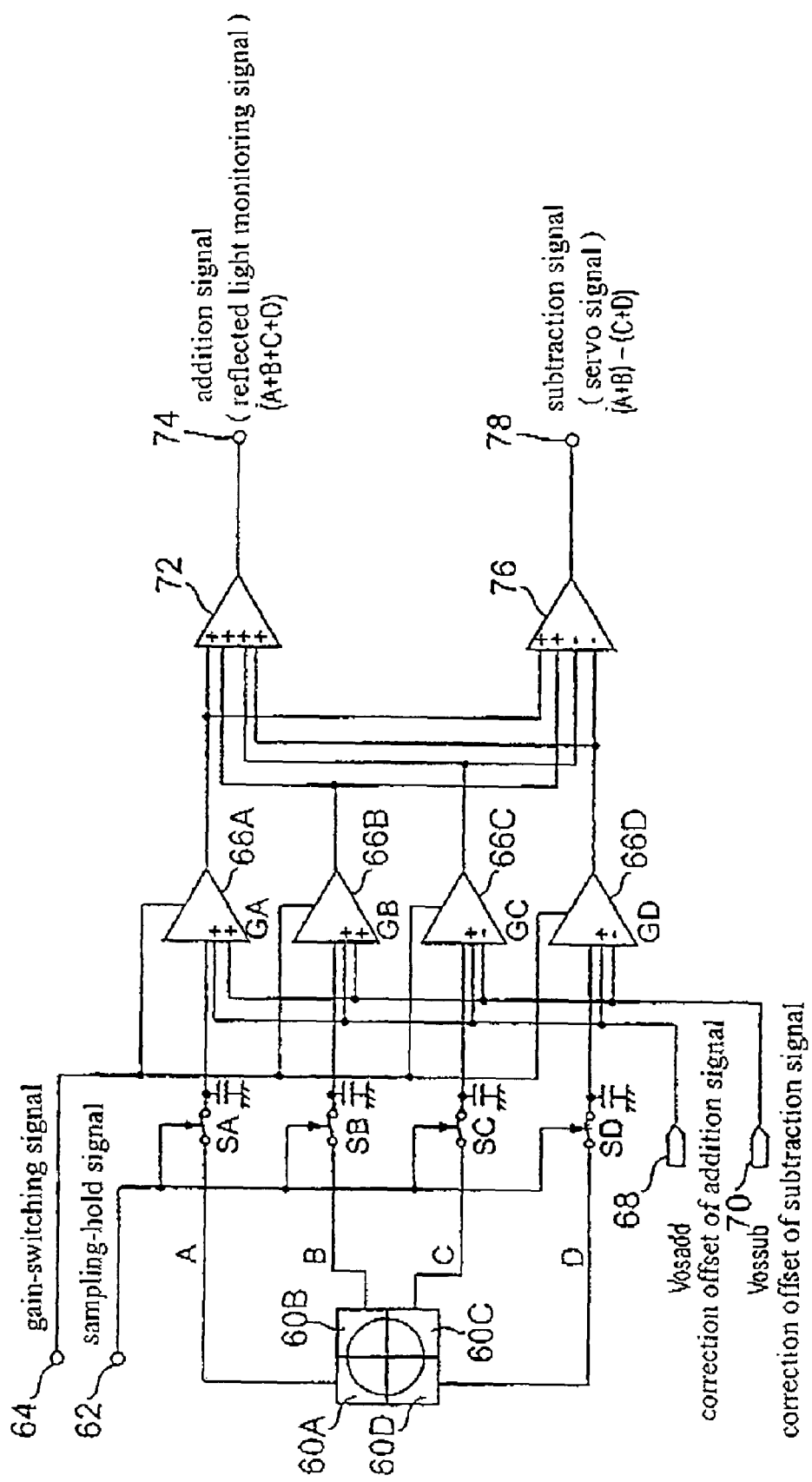
FIG. 2 is a first exemplary circuit diagram for the servo signal generator according to the invention.

FIG. 2 is a first exemplary circuit diagram for the servo signal generator according to the present invention. As shown in FIG. 2, spots of the light beams are illuminated on the optical disc 40 and the light beams reflected by the optical disc 40 are detected by four divided photo detectors 60A, 60B, 60C and 60D. The respective detected signals by the photo detectors 60A, 60B, 60C and 60D are transmitted to the corresponding sampling/hold circuits SA, SB, SC and SD.

Each of the sampling/hold circuits SA, SB, SC and SD consists of a switch and a condenser. Based on the sampling/hold signal, for example, a high-level timing, the switch of the sampling/hold circuit is on to sample the detected signals. The sampled detected signals are then held by the condenser of the sampling/hold circuit. The signals sampled and held by the sampling/hold circuits SA, SB, SC and SD are respectively provided to the corresponding amplifiers 66A, 66B, 66C and 66D.

According to a gain-switching signal from a terminal 64, the gains of the amplifiers 66A, 66B, 66C and 66D switch to different gains, which correspond to the foregoing detected signals when data are recorded and reproduced. Switching to different gains also causes the levels of the detected signals to have the same level when data are being recorded and reproduced. In addition, the amplifiers 66A, 66B add the corresponding detected signals with the correction offset voltage of the addition signal Vosadd from the terminal 68 and the correction offset voltage of the subtraction signal Vossub from the terminal 70. Moreover, the amplifiers 66C, 66D add the corresponding detected signals with the correction offset voltage of the addition signal Vosadd from the terminal 68 and subtract the correction offset voltage of the subtraction signal Vossub from the terminal 70.

Output signals A, B, C and D outputted from the amplifiers 66A, 66B, 66C and 66D are inputted to the calculating devices 72, 76. The calculating device 72 adds the detected signals A, B, C and D to generate an addition signal (A+B+C+D), which serves as the reflected light monitoring signal and is outputted from the terminal 74. Also, the calculating device 76 adds the detected signals A, B and subtracts the signals C, D to generate a subtraction signal (A+B)−(C+D), which serves as the tracking servo signal and is outputted from the terminal 78.

Figure 3:
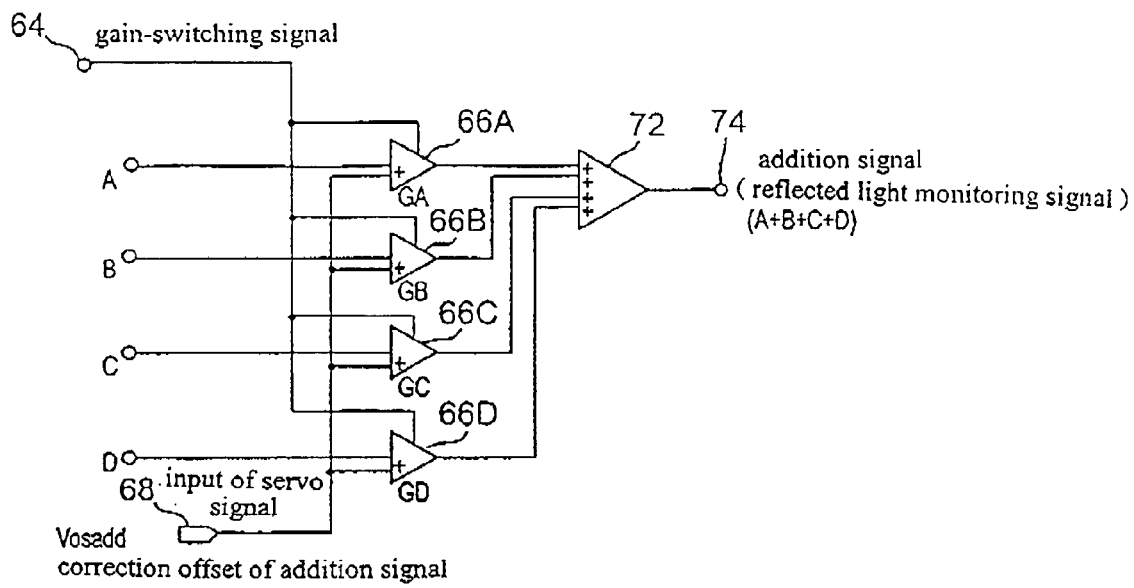
FIG. 3 is a portion of the circuit diagram in FIG. 2.

FIG. 3 is a portion of the circuit diagram in FIG. 2. With FIG. 3, the correction offset voltage Vosadd in the addition signal (A+B+C+D) is described in detail as follows.

Assuming that the offset voltages of the detected signals A, B, C and D respectively outputted from the sampling/hold circuits SA, SB, SC, SD are Va, Vb, Vc, and Vd, the input offset voltages of the amplifiers 66A, 66B, 66C, 66D are Vga, Vgb, Vgc, and Vgd respectively, the gains of the amplifiers 66A, 66B, 66C, 66D are G, and the calculating devices 72, 76 have no offset voltages. Under this condition, the total offset voltage of the addition signal Vadd is represented by the equation (3) below.

$$Vadd = -G(Va + Vb + Vc + Vd + Vga + Vgb + Vgc + Vgd) \quad (3)$$

Therefore, if 4Gvosadd =−Vadd, the total offset voltage of the addition signal can be compensated.

$$Vosadd = -Vadd / (4 \cdot G) \quad (4)$$
$$= -[(Va + Vb + Vc + Vd + Vga + Vgb + Vgc + Vgd)/4]$$

Accordingly, the correction offset voltage is not affected by the switch of the gain G because the gain G is not in the correction offset voltage of the addition signal Vosadd.

Figure 4:
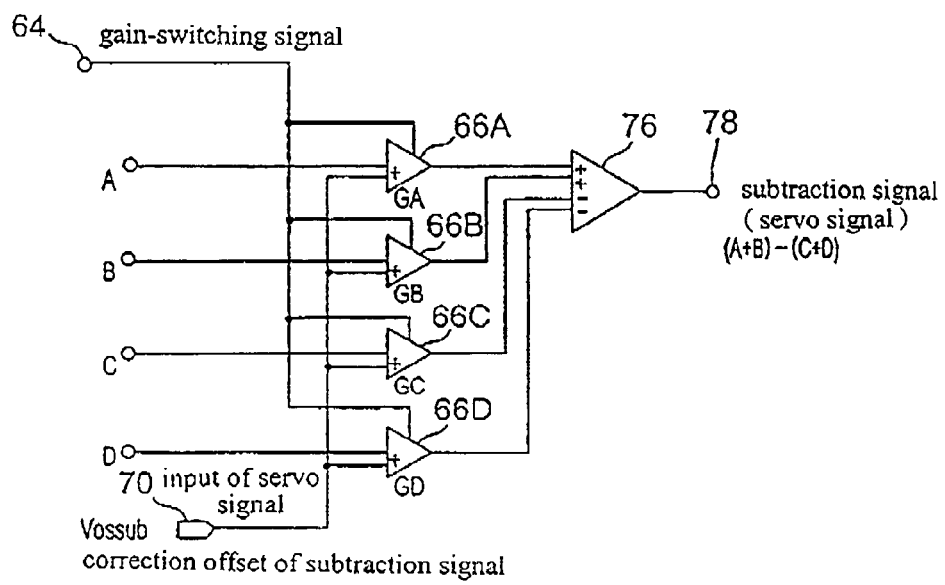
FIG. 4 is a portion of the circuit diagram in FIG. 2.

FIG. 4 is a portion of the circuit diagram in FIG. 2. With FIG. 4, the influence of the correction offset voltage Vossub in the subtraction signal (A+B)−(C+D) is described in detail as follows. A total offset voltage of the subtraction signal Vsub is represented in following equation (5).

$$Vsub = G[(Va + Vb + Vga + Vgb) - (Vc + Vd + Vgc + Vgd)] + G(2Vosadd - 2Vosadd) \quad (5)$$
$$= G[(Va + Vb + Vga + Vgb) - (Vc + Vd + Vgc + Vgd)]$$

Namely, equation (5) concludes that the correction offset voltage of the addition signal Vosadd has no influence on the total offset voltage of the subtraction signal.

Figure 5:
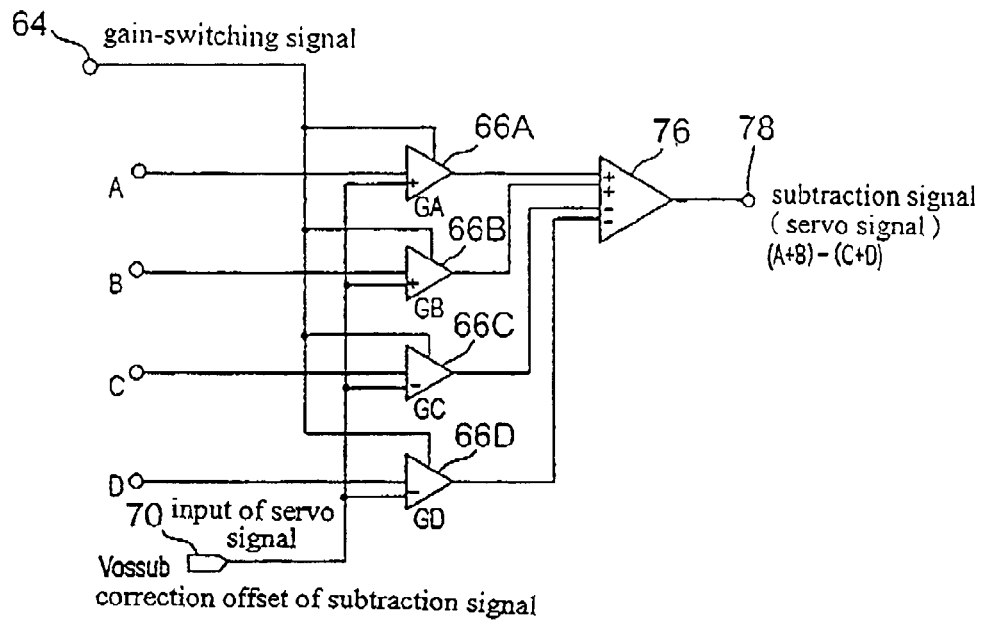
FIG. 5 is a portion of the circuit diagram in FIG. 2.

Next, FIG. 5 is a portion of the circuit diagram in FIG. 2. With FIG. 5, the correction offset voltage Vossub in the subtraction signal (A+B)−(C+D) is described in detail as follows. The total offset voltage of the subtraction signal Vsub is represented by the foregoing equation (5). Therefore, if 4Gvossub =− Vsub, the total offset voltage of the subtraction signal Vsub can be compensated.

$$Vossub = -Vsub / (4 \cdot G) \quad (6)$$
$$= -\{[(Va + Vb + Vga + Vgb) - (Vc + Vd + Vgc + Vgd)]/4\}$$

Accordingly, the correction offset voltage is not affected by the switch of the gain G because the gain G is not in the correction offset voltage of the subtraction signal Vossub.

Figure 6:
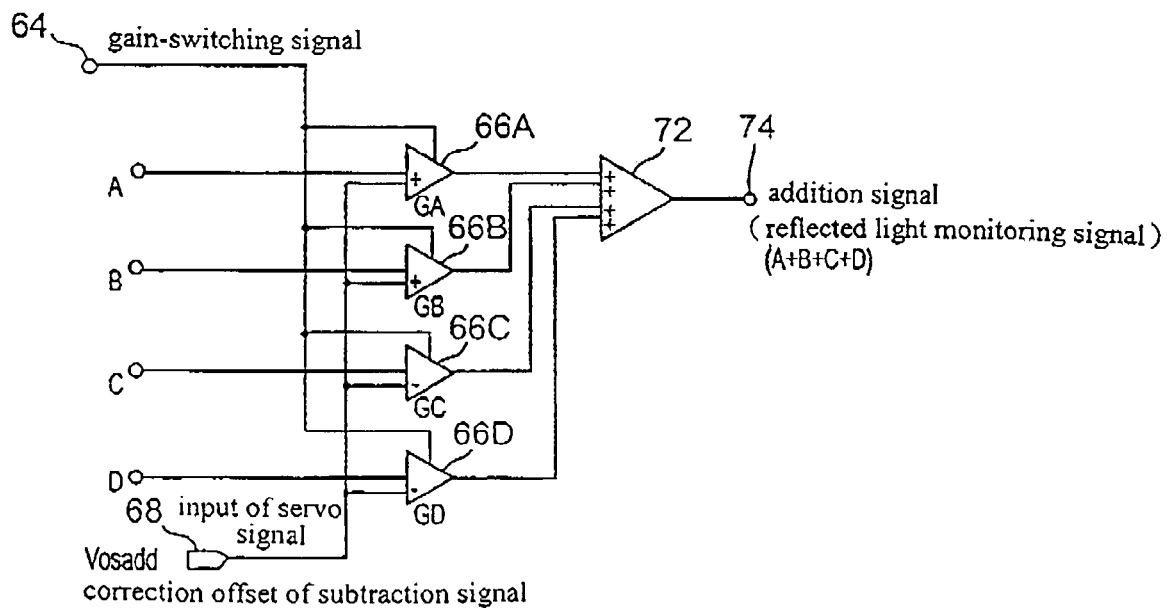
FIG. 6 is a portion of the circuit diagram in FIG. 2.

FIG. 6 is a portion of the circuit diagram in FIG. 2. With FIG. 6, the influence of the correction offset voltage Vossub in the addition signal (A+B+C+D) is described in detail as follows. A total offset voltage of the addition signal Vadd is represented in following equation (7).

$$Vadd = G(Va + Vb + Vc + Vd + Vga + Vgb + Vgc + Vgd) + G(2Vossub - 2Vossub) \quad (7)$$
$$= G(Va + Vb + Vc + Vd + Vga + Vgb + Vgc + Vgd)$$

Namely, it is the same result as in equation (3). Equation (3) concludes that the correction offset voltage of the subtraction signal Vossub has no influence on the total offset voltage of the addition signal.

Figure 7:
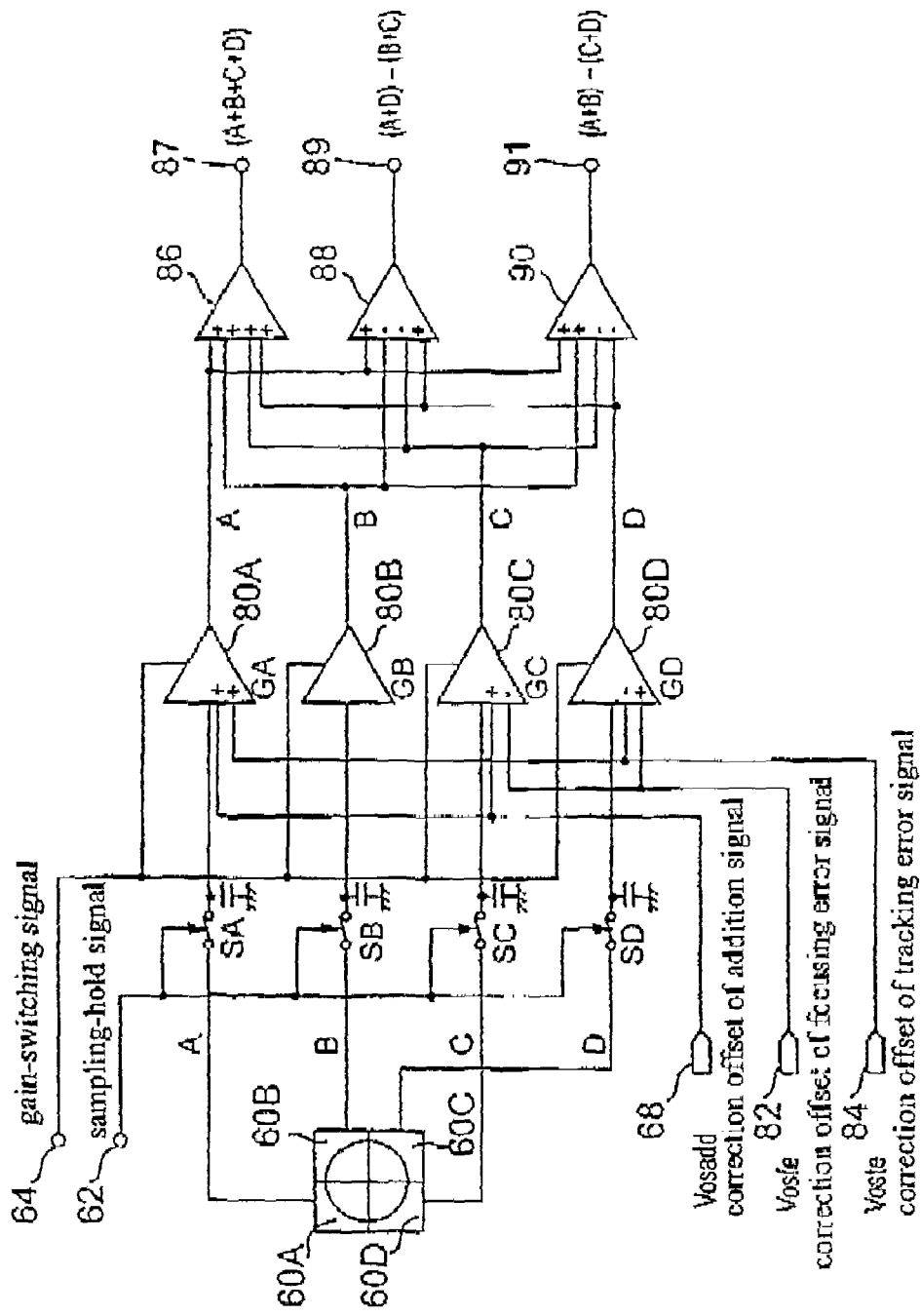
FIG. 7 is a second exemplary circuit diagram for the servo signal generator according to the invention.
Figure 8:
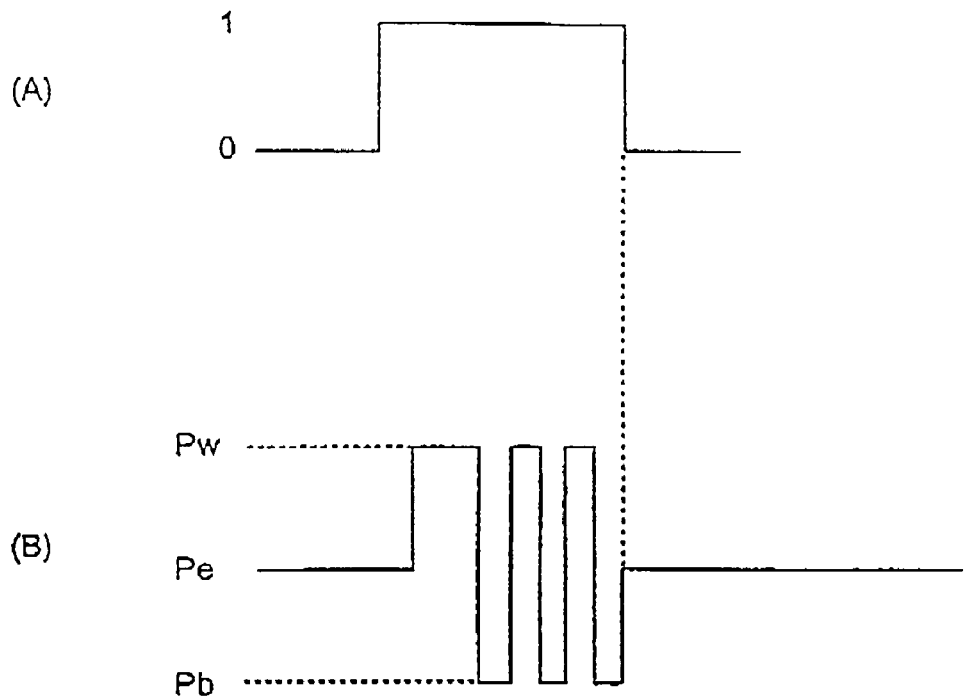
FIGS. 8A and 8B are waveforms for illustrating the recording signal and the power of the light beam for the erasable optical disc.
Figure 9:
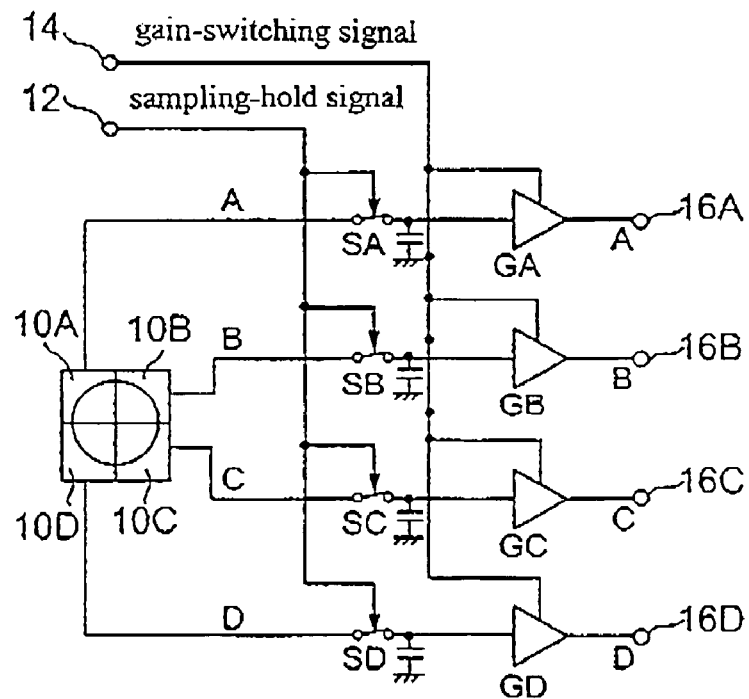
FIG. 9 is a n exemplary circuit diagram of a conventional servo signal generator.
Figure 10:
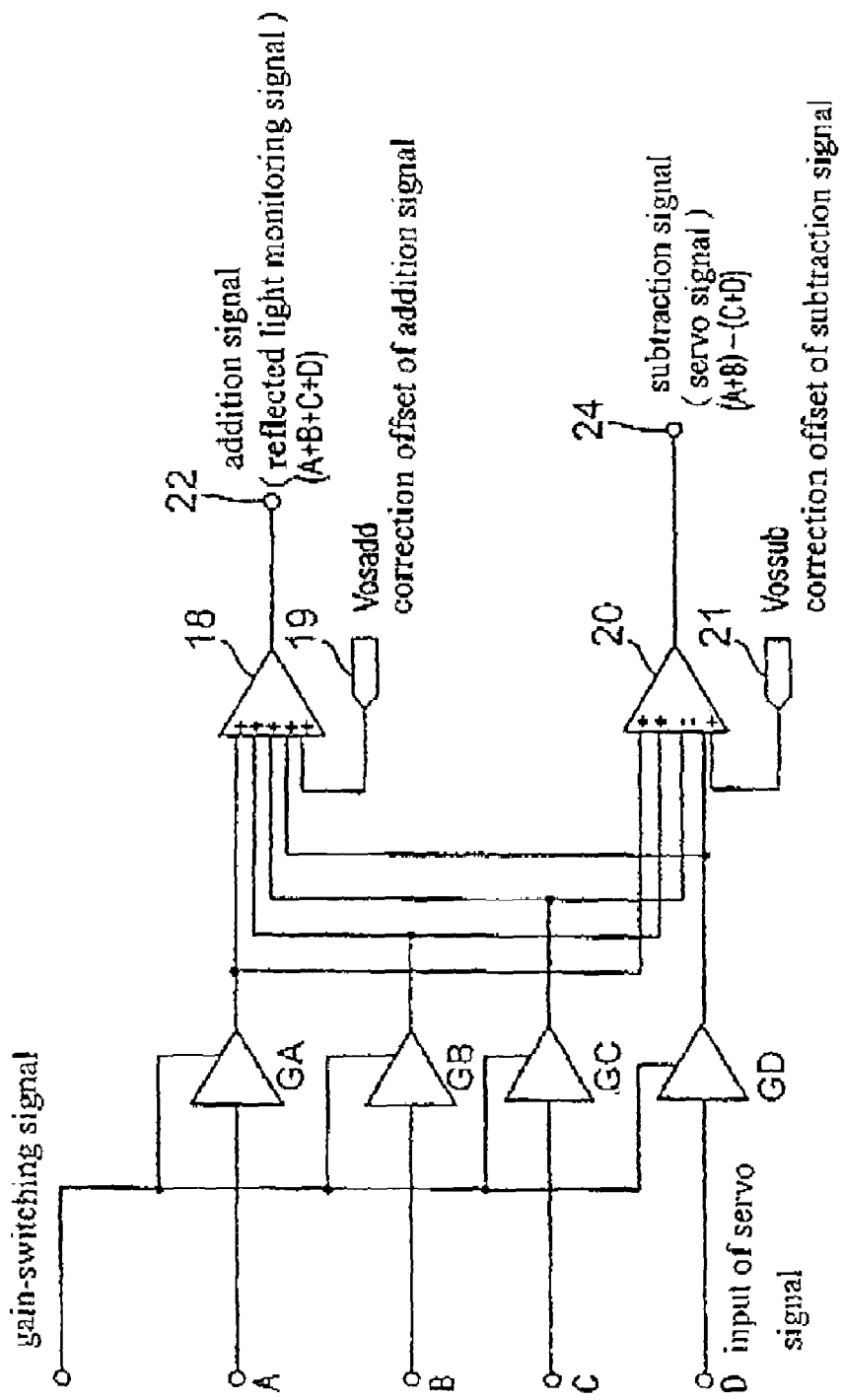
FIG. 10 is an exemplary circuit diagram of a conventional servo signal generator

FIG. 7 is a second exemplary circuit diagram for the servo signal generator according to the invention. The same labels and reference numbers represent the same elements in FIG. 2. As shown in FIG. 7, spots of the light beams are illuminated on the optical disc 40 and the light beams reflected by the optical disc 40 are detected by four divided photo detectors 60A, 60B, 60C and 60D. The respective detected signals by the photo detectors 60A, 60B, 60C and 60D are transmitted to the corresponding sampling/hold circuits SA, SB, SC and SD.

Each of the sampling/hold circuits SA, SB, SC and SD consists of a switch and a condenser. Based on the sampling/hold signal, for example, a high-level timing, the switch of the sampling/hold circuit is on to sample the detected signals. The sampled detected signals are then held by the condenser of the sampling/hold circuit. The s signals sampled and held by the sampling/hold circuits SA, SB, SC and SD are then respectively provided to the corresponding amplifiers 80A, 80B, 80C and 80D.

According to a gain-switching signal from a terminal 64, the gains of the amplifiers 80A, 80S, 80C and 80D switch to different gains, which correspond to the foregoing detected signals when data are recorded and reproduced. Switching to different gainscauses the levels of the detected signals to have the same level when data are recorded and reproduced. In addition, the amplifiers 80A add the corresponding detected signals with the correction offset voltage of the addition signal Vosadd from the terminal 68 and a correction offset voltage of the tracking error signal Voste from the terminal 84. Also, the amplifiers 80C add the corresponding detected signals with the correction offset voltage of the addition signal Vosadd and subtracts from a correction offset voltage of a focusing error signal Vosfe from the terminal 82.

In addition, the amplifiers 80D adds the corresponding detected signals with the correction offset voltage of the focusing error signal Vosfe, and subtracts from the correction offset voltage of a tracking error signal Voste. The correction offset is not added to the amplifier 80B. The output signals A, B, C and D from the amplifiers 80A, 80B, 80C and 80D are respectively inputted to calculating devices 86, 88 and 90.

The calculating device 86 adds the detected signals A, B, C and D to generate an addition signal (A+B+C+D), which serves as the reflected light monitoring signal and is outputted from the terminal 87. In addition, the calculating device 88 adds the detected signals A, D and subtracts the signals B, C to generate a subtraction signal (A+B)−(C+D), which serves as the focusing servo signal and is outputted from the terminal 89. Also, the calculating device 90 adds the detected signals A, B and subtracts the signals C, D to generate a subtraction signal (A+B)−(C+D), which serves as the tracking servo signal and is outputted from the terminal 91.

Assuming that the total offset voltage of the addition signal is Vadd, the correction offset voltage of the addition signal is Vosadd, the total offset voltage of the focusing servo signal is Vfe, the correction offset voltage of the focusing servo signal is Vosfe, the total offset voltage of the tracking servo signal is Vte, the correction offset voltage of the tracking servo signal is Voste, the offset voltages of the detected signals A, B, C and D respectively outputted from the sampling/hold circuits SA, SB, SC, SD are Va, Vb, Vc, and Vd, the input offset voltages of the amplifiers 80A, 80SB, 80C, 80D are Vga, Vgb, Vgc, and Vgd respectively, the gains of the amplifiers 80A, 80B, 80C, 80D are G, and the calculating devices 86, 88, 90 have no offset voltages. In the condition, the total offset voltage of the addition signal Vadd is represented by the equation (8) below.

$$Vadd=-G[(Vosadd+Voste)+(Vosadd-Vosfe)+(Vosfe-Voste)]=-2GVosadd \quad (8)$$

Therefore, if 2GVosadd=−Vadd, the total offset voltage of the addition signal can be compensated. In addition, because of Vadd=G (Va+Vb+Vc+Vd+Vga+Vgb+Vgc+Vgd), Vosadd can be represented by following equation:

$$Vosadd = -Vadd/(2G)$$
$$= -(Va+Vb+Vc+Vd+Vga+Vgb+Vgc+Vgd)/2.$$

Accordingly, the correction offset voltage of the addition signal Vosadd is not affected by the switch of the gain G because the gain G is not in the correction offset voltage of the addition signal Vosadd.

In addition, the total focusing offset voltage of the focusing servo signal is represented by following equation (9):

$$Vfe=-G[(Vosadd+Voste)+(Vosfe-Voste)-(Vosadd-Vosfe)]=-2GVosfe \quad (9)$$

Therefore, if 2GVosfe=−Vfe, the total offset voltage of the focusing servo signal can be compensated. In addition, because of Vfe=G (Va−Vb−Vc+Vd+Vga−Vgb−Vgc+Vgd), Vosfe can be represented by following equation:

$$Vosfe = -Vfe/(2G)$$
$$= -[(Va-Vb-Vc+Vd+Vga-Vgb-Vgc+Vgd)]/2.$$

Accordingly, the correction offset voltag is not affected by the switch of the gain G because the gain G is not in the correction offset voltage of the focusing servo signal Vosfe.

In addition, the total offset voltage of the tracking servo signal is represented by following equation (10):

$$Vte=-G[(Vosadd+Voste)-(Vosadd-Vosfe)-(Vosfe-Voste)]=-2GVoste \quad (10)$$

Therefore, if 2GVoste=−Vte, the total offset voltage of the tracking servo signal can be compensated. In addition, because of Vte=G(Va+Vb−Vc−Vd+Vga+Vgb−Vgc−Vgd), Voste can be represented by following equation.

$$Voste = -Vte/(2G)$$
$$= -[(Va+Vb-Vc-Vd+Vga+Vgb-Vgc+Vgd)]/2.$$

Accordingly, the correction offset voltage is not affected by the switch of the gain G because the gain G is not in the correction offset voltage of the tracking servo signal Voste.

In addition, referring to claim 1, the calculating device 72 corresponds to the first calculating device, while the calculating device 76 corresponds to the second is calculating device. The correction offset voltage for the addition signal Vosadd corresponds to the first correction offset value, while the correction offset voltage for the subtraction signal Vossub corresponds to the second correction offset value.

According to the foregoing descriptions, the invention provides an optical disc device for changing the intensities of the light beams illuminated on an optical disc. The optical disc device comprises the following elements. A plurality of photo detectors is used for detecting the reflected light beams of the light beams illuminated on an optical disc A plurality of amplifiers is used for changing gains to respectively amplify the output signals of the photo detectors when data are recorded and reproduced on/from the optical disc. A calculating device is also used for calculating the output signals of the amplifiers to generate the servo signals. By means of adding the correction offset signals for correcting the offset voltages of the amplifiers and the photo detectors to the amplifiers, the correction offset signals are amplified and therefore it is not necessary to change the correction offset voltages even though the gain of the amplifier is changed.

The calculating device further comprises a first calculating device and a second calculating device for respectively performing different operations on the output signals of the amplifiers. Because the correction offset signals respectively added to the amplifiers further comprise a first correction offset value that eliminates the offset voltages calculated from the first calculating device and a second correction offset value that eliminates the offset voltagescalculated from the second calculating device, the offset voltages calculated from the first and the second calculating devices can be eliminated.

The correction offset signals respectively added to a plurality of amplifiers are signals separated from the first and the second correction offset values. Because the second offset value calculated from the first calculating device is "0" and the first offset value calculated from the second calculating device is "0", the offset voltages calculated from the first calculating devices can be eliminated without using the unnecessary second correction offset value and the offset voltages calculated from the second calculating devices can be eliminated without using the unnecessary first correction offset value.

While the present invention has been described with a preferred embodiment, this description is not intended to limit our invention. Various modifications of the embodiment will be apparent to those skilled in the art. It is therefore contemplated that the appended claims will cover any such modifications or embodiments as fall within the true scope of the invention.

What claimed is:

1. An optical disc device for changing intensities of light beams illuminated on an optical disc when recording and reproducing on/from the optical disc, the optical disc device comprising:

a photo detecting device divided into a plurality of photo detectors for detecting reflected light beams of the light beams illuminated on an optical disc;

a plurality of amplifiers for changing gains to respectively amplify output signals of the photo detectors when recording and reproducing on/from the optical disc; and a calculating device for calculating output signals of the amplifiers to generate servo signals, wherein correction offset signals for correcting offset voltages of the amplifiers and the photo detectors are added to the amplifiers, respectively, and are amplified by the amplifiers, and the correction offset signals have a value determined by the offset voltages of the photo detectors and the offset voltages of the amplifiers.

2. The optical disc device of claim 1, wherein the calculating device further comprises a first calculating device and a second calculating device for respectively performing different operations on the output signals of the amplifiers, wherein the correction offset signals respectively added to the amplifiers further comprise a first correction offset value that eliminates the offset voltages from a result of the first calculating device, and a second correction offset value that eliminates the offset voltages from a result of the second calculating device.

3. The optical disc device of claim 2, wherein the correction offset signals respectively added to the amplifiers are signals separated from the first and the second correction offset values, wherein the second offset value is "0" in the result of the first calculating device and the first offset value is "0" in the result of the second calculating device.

* * * * *